United States Patent [19]

Taguchi

[11] Patent Number: 5,345,287
[45] Date of Patent: Sep. 6, 1994

[54] APPARATUS FOR CORRECTING PARALLAX AND/OR DIOPTER OF CAMERA

[75] Inventor: Ichiro Taguchi, Tokyo, Japan

[73] Assignee: Asahi Kogaku Kogyo Kabushiki Kaisha, Tokyo, Japan

[21] Appl. No.: 126,015

[22] Filed: Sep. 24, 1993

Related U.S. Application Data

[63] Continuation of Ser. No. 836,418, Feb. 18, 1992, abandoned.

[30] Foreign Application Priority Data

Feb. 19, 1991 [JP] Japan .................................. 3-006974
Feb. 19, 1991 [JP] Japan .................................. 3-006975

[51] Int. Cl.⁵ .......................................... G03B 13/14
[52] U.S. Cl. .............................. 354/221; 354/195.12; 359/705
[58] Field of Search ............... 354/164, 219, 220, 221, 354/222, 223, 224, 225, 199, 200, 201, 195.12; 359/705

[56] References Cited

U.S. PATENT DOCUMENTS

| | | | |
|---|---|---|---|
| 4,924,247 | 5/1990 | Suzuki et al. | 354/164 |
| 4,936,664 | 6/1990 | Haraguchi et al. | 359/696 |
| 4,944,030 | 7/1990 | Haraguchi et al. | 354/403 |
| 5,012,273 | 4/1991 | Nakamura et al. | 354/485 |
| 5,016,032 | 5/1991 | Haraguchi et al. | 354/195.1 |
| 5,117,247 | 5/1992 | Nakai et al. | 354/222 |

FOREIGN PATENT DOCUMENTS

| | | |
|---|---|---|
| 674317 | 4/1939 | Fed. Rep. of Germany . |
| 4023783 | 1/1991 | Fed. Rep. of Germany . |
| 2638541 | 10/1989 | France . |
| 62-284336 | 12/1987 | Japan . |
| 63-179340 | 7/1988 | Japan . |
| 1147439 | 6/1989 | Japan . |
| 2107131 | 8/1990 | Japan . |
| 495290 | 11/1938 | United Kingdom . |
| 521452 | 5/1940 | United Kingdom . |
| 1442964 | 7/1976 | United Kingdom . |
| 2234360 | 1/1991 | United Kingdom . |
| 87 07038 | 11/1987 | World Int. Prop. O. . |

OTHER PUBLICATIONS

English Abstract of Japanese Patent No. 1-147439.
English Abstract of Japanese Patent No. 62-284336.
Patent Abstracts of Japan, vol. 12, No. 456 (P-793) & JP-A 63 179 340.

*Primary Examiner*—Howard B. Blankenship
*Attorney, Agent, or Firm*—Sandler Greenblum & Bernstein

[57] ABSTRACT

A parallax and/or diopter correcting apparatus in a camera having a photographing optical system separate from a finder optical system, including a reflecting mirror provided in the finder optical system to change the direction of the optical axis thereof. A reflecting mirror driving mechanism is provided for rotating the reflecting mirror in a first rotational direction to move the segment of the finder optical system optical axis, located in front of the reflecting mirror, towards the optical axis of the photographing optical system, and/or for rotating the reflecting mirror in a second rotational direction perpendicular to the first rotational direction.

29 Claims, 6 Drawing Sheets

APPARATUS FOR CORRECTING PARALLAX AND/OR DIOPTER OF CAMERA

This application is a continuation, of application Ser. No. 07/836,418, filed Feb. 18, 1992, now abandoned.

BACKGROUND OF THE INVENTION

1. Field of the Invention

The present invention relates to an apparatus for correcting parallax and/or diopter of a camera having a finder optical system separate from the photographing optical system.

2. Description of Related Art

In a camera having a finder optical system separate from the photographing optical system, parallax inevitably occurs. Parallax is particularly significant in the macro-photographing range. To correct a large degree of parallax, a bright indicating frame may be provided to indicate the photographable range in the field of view of the finder when in a macro-photographing range. Further, a prism may be provided which varies the direction of the optical axis of the finder optical system on the short object distance side. Parallax may also be corrected by providing a view correcting mask which covers a part of the field of view of the finder. The prism or the view correcting mask is inserted into the finder optical system only upon macro-photographing.

However, indication of the photographable range (macro-photographing range) with a bright frame is indistinct. Also, the insertion of the prism or the view correcting mask into the finder optical system requires a complex driving mechanism for moving the same and furthermore requires a large space. Accordingly, when the above devices are used for parallax correction, a compact and inexpensive camera can not be realized.

Furthermore, an object to be observed through the finder, upon macro-photographing, is located nearer the camera than an object to be taken upon ordinary photographing. Therefore, it is necessary to correct the diopter. In a conventional diopter correction mechanism, a specific lens in the finder optical system is moved to a predetermined position in the optical axis direction upon macro-photographing. However, it is mechanically difficult to move only the specific diopter correcting lens in the finder optical system, in order to correct the diopter, in association with the transfer from the normal photographing position to the macro photographing position. In particular, in a zoom lens camera which has a macro-photographing range, it is difficult to produce a cam mechanism which can effect the slight displacement necessary to adjust the diopter correcting lens.

SUMMARY OF THE INVENTION

The primary object of the present invention is to eliminate the drawbacks mentioned above by providing a simple apparatus for correcting parallax and/or diopter of a camera.

To achieve the above-mentioned object, according to the present invention, there is provided a parallax and/or diopter correcting apparatus in a camera having a photographing optical system separate from a finder optical system. The correcting apparatus includes a reflecting mirror provided in the finder optical system to change the direction of an optical axis thereof. The correcting appratus further includes a reflecting mirror driving mechanism for rotating the reflecting mirror in a first rotational direction, to move the segment of the finder optical system optical axis located in front of the reflecting mirror towards the optical axis of the photographing optical system, and/or for rotating the reflecting mirror in a second rotational direction perpendicular to the first rotational direction.

According to another aspect of the present invention, there is provided a parallax correcting apparatus in a camera having a macro-photographing range wherein the photographing optical system and finder optical system are separate. The correcting apparatus includes a finder optical system driving mechanism for moving a lens assembly of the finder optical system in a manner which varies the focal length of the finder optical system in association with a change in the focal length of the photographing optical system. The apparatus further includes a reflecting mirror provided to vary the direction of the optical axis of the finder optical system. A reflecting mirror driving mechanism is provided for varying the direction of the reflecting mirror, so as to make the field of view of the finder optical system coincidental with a photographable range thereof. The reflecting mirror driving mechanism is in association with the operation of the finder optical system driving mechanism, which is actuated to transfer the finder optical system to the macro-photographing range.

According to still another aspect of the present invention, a diopter correcting apparatus in a camera having a macro-photographing range and including a photographing optical system separate from a finder optical system includes a finder optical system driving mechanism for moving a lens assembly of the finder optical system. The lens assembly will be moved in a manner which varies the focal length of the finder optical system in association with a change in the focal length of the photographing optical system. The apparatus further includes a reflecting mirror driving mechanism for moving the reflecting mirror to vary the optical path length of the finder optical system. A reflecting mirror rotating mechanism is provided for varying the direction of the reflecting mirror of the finder optical system, thereby correcting a deviation of the optical axis of the finder optical system caused by the change in optical path length, in association with the operation of the finder optical system driving mechanism which is actuated to transfer the finder optical system to the macro-photographing position.

The present disclosure relates to subject matter contained in Japanese Utility Model Application Nos.03-6974 and 03-6975 (both filed on Feb. 19, 1991) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENTS

Figure 1:
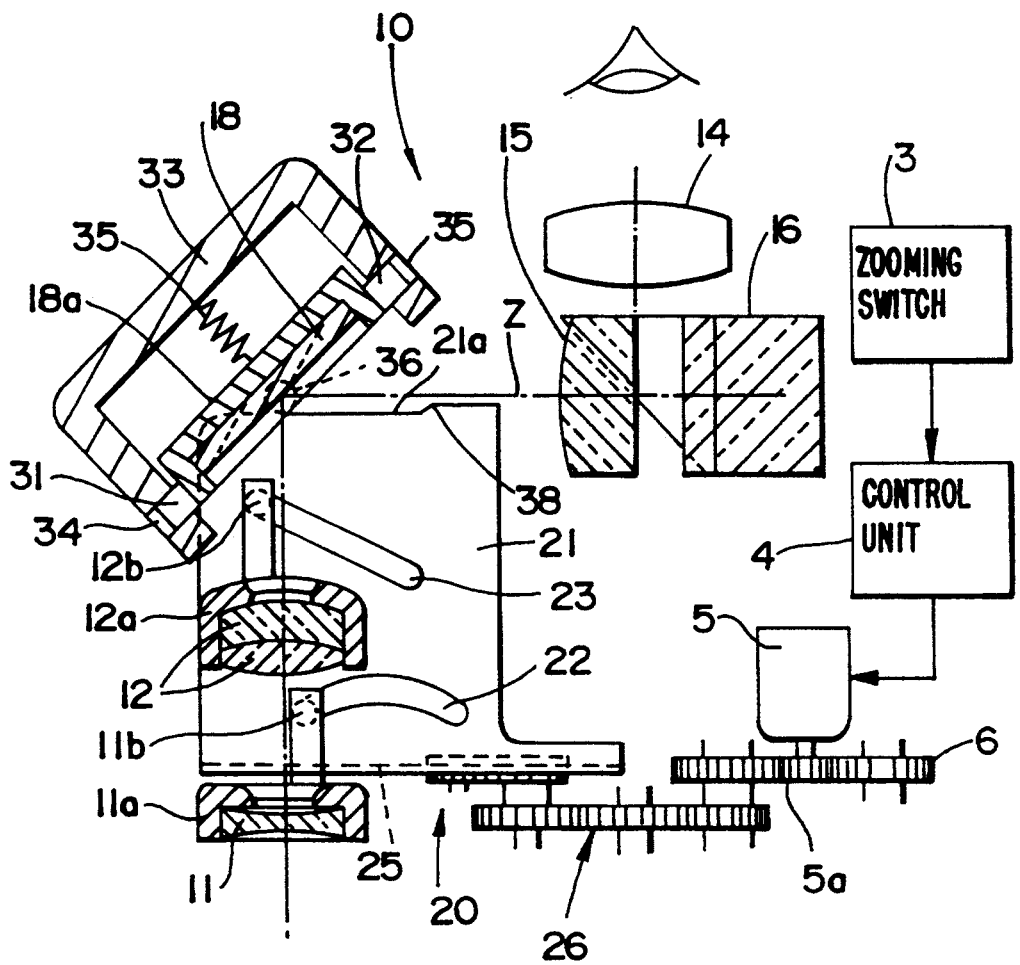
FIG. 1 is a sectional view of a finder optical system to which a parallax correcting apparatus according to the present invention is applied.
Figure 2:
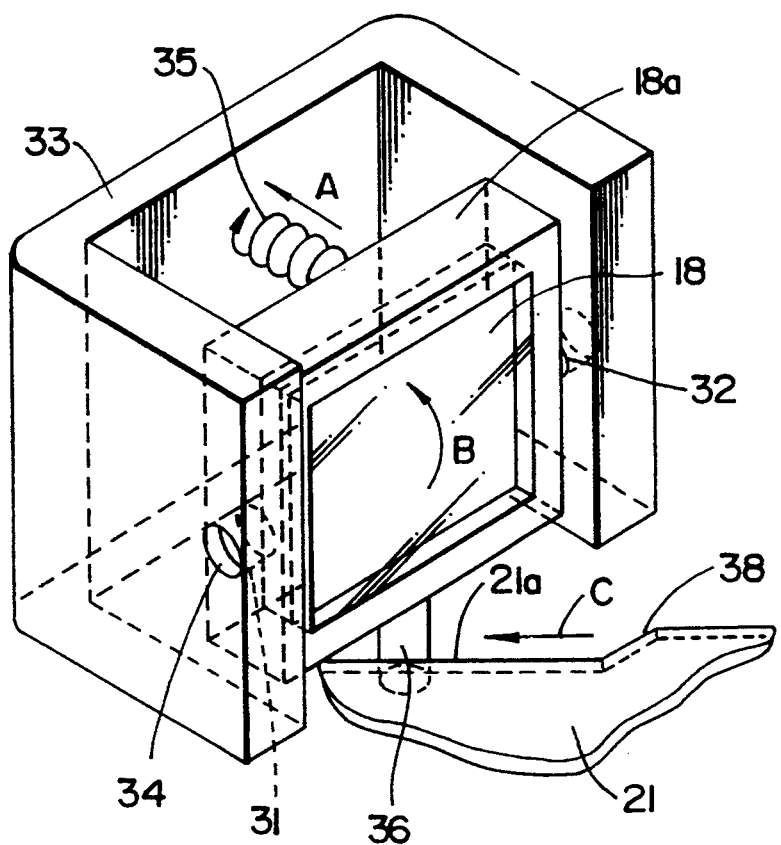
FIG. 2 is a perspective view of a reflecting mirror unit of the parallax correcting apparatus, as shown in FIG. 1.
Figure 6:
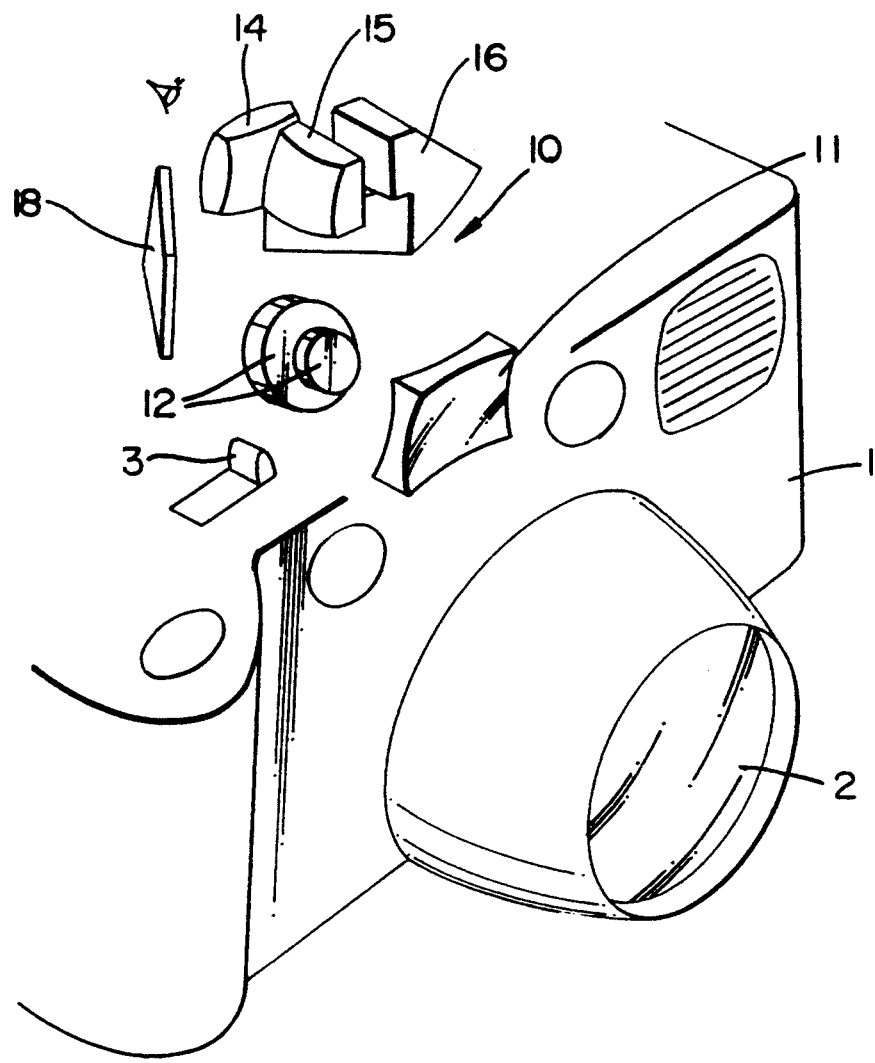

FIGS. 1 and 2 show a first embodiment of the present invention, in which a parallax correcting apparatus is used in a 35 mm zoom compact camera, as shown in FIG. 6. In FIG. 6, a taking lens 2 is an autofocusing type zoom lens which brings an object into focus, by way of a focusing control which is automatically effected by an autofocusing device (not shown). Zooming (continuous adjustment of the focal length) is manually effected by a zooming switch 3 provided on the camera body 1. When the zooming switch 3 is moved to the "MACRO" position, the taking lens 2 is moved to the macro-photographing position at which a picture in a close object range can be taken.

The finder optical system 10 is comprised of four lens groups, including first and second movable lens groups 11 and 12, movable only in the direction of the optical axis, and first and second stationary lens groups 14 and 15, provided on the eyepiece side. The first and second movable lens groups 11 and 12 are located directly above the taking lens 2 when the camera is in a normal horizontal posture. A Porro prism 16 is provided between the first and second stationary lens groups 14 and 15. A plane reflecting mirror 18 is provided between the second stationary lens group 15 and the second movable lens groups 12.

FIG. 1 shows a finder optical system together with interacting elements. A control unit 4 for performing various automatic controlling operations outputs the control signal to a drive circuit of a zooming motor 5 when the zooming switch 3 is actuated.

The zooming motor 5 drives both a taking lens optical system driving mechanism 6 which in turn drives the taking lens 2, and a finder optical system driving mechanism 20 which drives the movable lens groups 11 and 12 of the finder optical system 10. The finder optical system driving mechanism 20 will be described below in detail with reference to FIG. 1.

A flat cam plate 21, movable in the left and right directions as viewed in FIG. 1, has an arched first cam groove 22 and a linear second cam groove 23. First and second lens frames 11a and 12a of the first and second movable lens groups 11 and 12 have pins 11b and 12b connected thereto, which are fitted in the first and second cam grooves 22 and 23, respectively.

The cam plate 21 is provided on its bottom surface with a rack 25 which is substantially parallel with the direction of movement of the cam plate 21. The rack 25 is functionally connected to an output gear 5a of the zooming motor 5 through an intermediate gear train 26. Consequently, when the zooming motor 5 is rotated, the focal length of the taking lens 2 is varied and the cam plate 21 is moved in the lateral direction (right and left direction) through the intermediate gear train 26. As a result of the cam plate 21 movement, the pins 11b and 12b fitted in the respective cam grooves 22 and 23, cause the movable lens groups 11 and 12 to move in the optical axis direction thereof (upward and downward direction in FIG. 1), so that the focal length of the finder optical system 10 is varied in association with a change in the focal length of the taking lens 2.

The reflecting mirror 18 is oriented in such a manner so as to change the direction of the optical axis Z of the finder optical system 10 by approximately 90° in a substantially horizontal plane. The Porro prism 16 again bends the optical axis Z of the finder optical system 10 by approximately 90° in a substantially horizontal plane forming an erect image, as observed by a photographer.

Thus, a finder field of view, which substantially corresponds to the photographable range of the zoom taking lens 2, can be obtained through the finder optical system 10 as constructed above. However, parallax at the macro-photographing position can not be eliminated by the finder optical system 10.

To eliminate parallax, in the illustrated embodiment, a pair of coaxial pins 31 and 32 are provided on the opposite lateral ends of a mirror frame 18a, which holds the reflecting mirror 18 in such a manner so as to be rotatably fitted in holes 34 and 35 formed in a stationary frame 33, as shown in FIG. 2. The axis of the pins 31 and 32 is located on a reflecting surface of the reflecting mirror 18, and passes through a reflecting point of the optical axis Z of the finder optical system 10.

Consequently, the reflecting mirror 18 is rotatable about a first rotation axis defined by the pins 31 and 32. It should be appreciated that the reflecting point on the optical axis Z does not move during the rotation of the reflecting mirror 18. The axis of the pins 31 and 32, i.e., the first rotation axis of the reflecting mirror 18 is located in a substantially horizontal plane when the camera is in a normal horizontal posture.

The reflecting mirror 18 is continuously biased rearward in a direction A (FIG. 2) by a tension coil spring 35 connected to an upper portion of the rear surface thereof to rotate the mirror 18 about the pins 31 and 32 in a direction B (FIG. 2). The mirror frame 18a is provided on the lower surface thereof with a stop pin 36 projecting downward therefrom. The stop pin 36 abuts against the side surface (end surface cam) of the cam plate 21 by the force of the coil spring 35.

Consequently, the direction of the reflecting mirror 18 is determined by the position of the side surface 21a of the cam plate 21. In a normal zoom range, the reflecting mirror 18 lies in a vertical plane so as not to change the vertical direction of the optical axis Z of the finder optical system 10. Namely, in this position, the optical axis Z of the finder optical system 10 is kept substantially parallel to the optical axis of the taking lens system 20.

The end surface 21a, of the cam plate 21 against which the stop pin 36 abuts is provided on the right end thereof with a projection 38 which comes into contact with the stop pin 36 when the cam plate 21 is moved in the direction C to the leftmost position, as viewed in FIG. 2, at the macro-photographing position.

When the stop pin 36 comes into contact with the projection 38, the stop pin 36 is moved backwards by the projection 38 against the force of the spring 35. As a result, the reflecting mirror 18 is rotated in a direction opposite the direction B, so that the reflecting surface of the reflecting mirror 18 faces downward. Consequently, the optical axis Z of the finder optical system 10 is adjusted to be nearer the optical axis of the taking lens 2 on the forward side (object side) of the reflecting mirror 18. The field of view of the finder optical system 10 thus meets the photographable range, thereby correcting the parallax.

Note that the present invention can be applied to a multifocus camera in which the focal length is discontinuously adjusted.

As can be seen from the foregoing, according to the present invention, since parallax at the macro-photographing position can be corrected by changing the direction of the reflecting mirror provided in the finder optical system, in association with the finder optical system driving mechanism which moves the lens groups of the finder optical system, parallax correction requires only a few elements and minimal space. Thus, a small and simple camera having a macro-function can be inexpensively realized.

Figure 3:
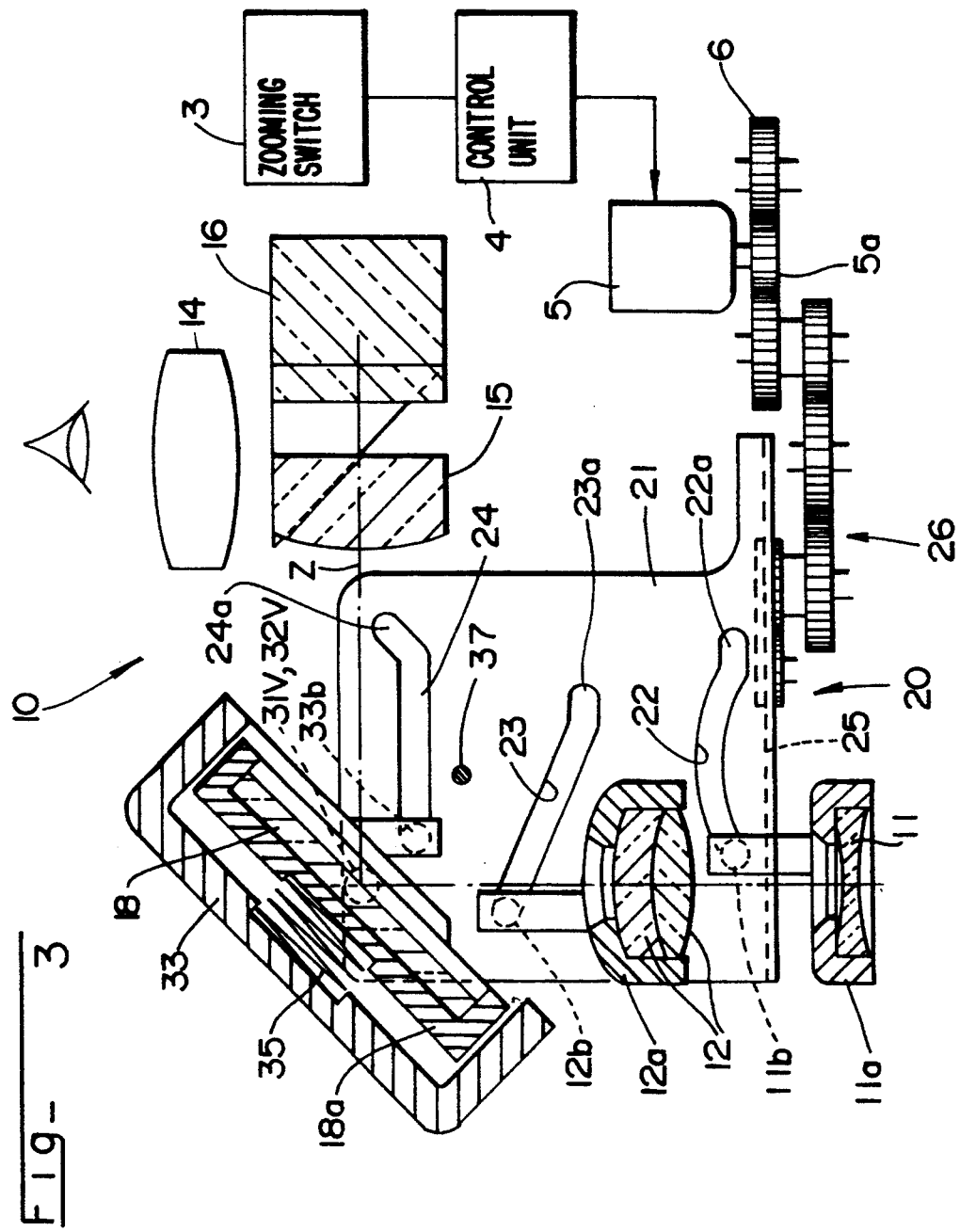
FIG. 3 is a sectional view of a finder optical system to which a diopter correcting apparatus according to the present invention is applied.
Figure 4:
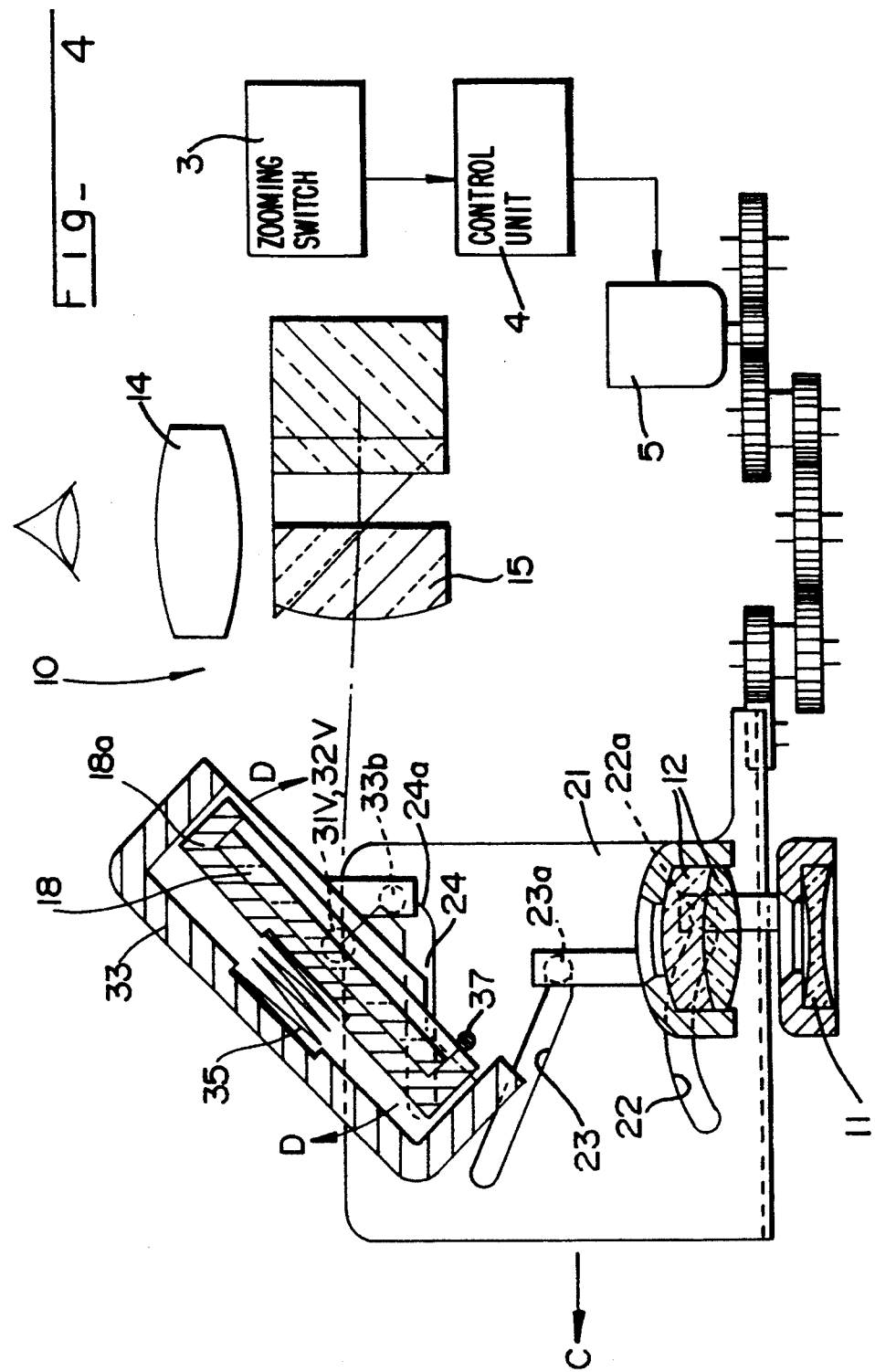
FIG. 4 is a sectional view of a finder optical system, similar to FIG. 3, but shown in a different position.
Figure 5:
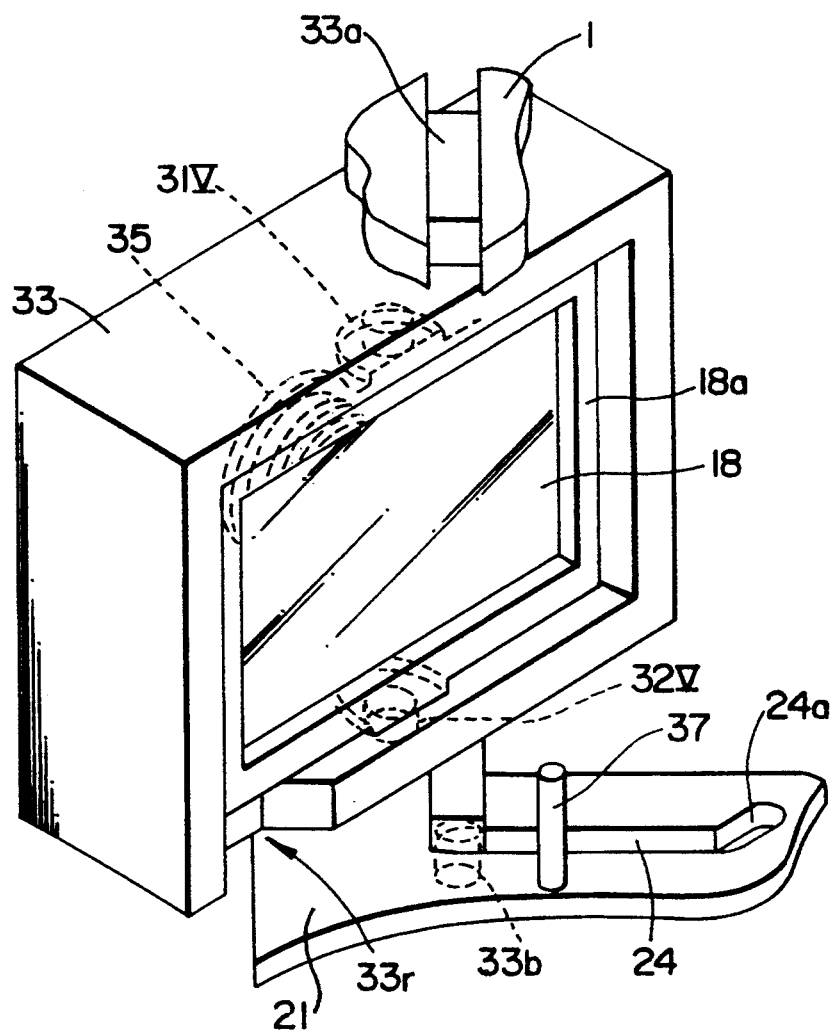
FIG. 5 is a perspective view of a reflecting mirror unit of the diopter correcting apparatus, as shown in FIGS. 3 and 4; and, FIG. 6 is a perspective view of a main part of a camera having a zoom photographing optical system and a zoom finder optical system separate therefrom.

FIGS. 3 through 5 show another embodiment of the present invention, in which a diopter correcting apparatus is applied to a camera as shown in FIG. 6.

In the embodiment illustrated in FIGS. 3 through 5, the reflecting mirror 18 is moved to change the optical path length of a finder optical system 10A to thereby correct the diopter at the macro-photographing position. In FIGS. 3 through 5, the elements corresponding to those in FIGS. 1 and 2 are designated with the same reference number.

In this embodiment, a pair of upper and lower coaxial pins 31V and 32V are provided on the upper and lower portions of the mirror frame 18a and rotatably supported by a sliding frame 33. The common axis of the pins 31V and 32V is located on the reflecting surface of the reflecting mirror 18 and extends substantially in the vertical direction when the camera is in the normal horizontal posture. The common axis of the pins 31V and 32V passes through the reflecting point of the optical axis Z of the finder optical system 10A.

Consequently, the reflecting mirror 18 is rotatable about a second rotation axis defined by the axis of the pins 31V and 32V. The reflecting point of the optical axis Z is not displaced during the rotation of the reflecting mirror 18.

A compression coil spring 35, having a relatively large diameter, is provided between the center portion of the rear surface of the mirror frame 18a and the sliding frame 33 to stably maintain the mirror 18a substantially parallel with the back of the sliding frame 33.

The sliding frame 33 is provided with a projection 33a (FIG. 5) which is engaged in the linear cam groove formed in the camera body 1, so that the sliding frame 33 is moved only in the optical axis direction (vertical direction in FIGS. 3 and 4) of the movable lens groups 11 and 12.

The pin 33b, connected to the sliding frame 33, is fitted in a third cam groove 24 formed in the cam plate 21, so that the movement of the cam plate 21 causes the sliding frame 33 to move in the optical axis direction of the movable lens groups 11 and 12.

Since the third cam groove 24 of the cam plate 21 is parallel with the direction of movement of the cam plate 21 within the zoom range at an ordinary object distance, the sliding frame 33 and consequently the reflecting mirror 18 do not move.

The cam groove 24 has an end portion 24a corresponding to the macro-photographing position and is bent away from the movable lens groups 11 and 12. The cam plate 21 is provided with a stop pin 37 which comes into contact with the front left side face of the mirror frame 18a to rotate the same when the pin 33b is engaged in the cam groove end portion 24a (see FIG. 4). The sliding frame 33 is provided with a recess 33r at the front left side face thereof so as not to interfere with the stop pin 37 (see FIG. 5).

As can be seen from the foregoing, according to the second embodiment of the present invention, a finder field of view of the finder optical system 10A, substantially corresponding to the photographable range of the taking lens 2, can be obtained within a normal zooming range, similar to the first embodiment, as shown in FIGS. 1 and 2.

FIG. 4 shows an optical system arrangement in a macro-photographing position in which the cam plate 21 is moved to the leftmost position in the direction C by the zooming motor 5.

As a result the in 33b, connected to the sliding frame 33, is engaged in the macro-portion 24a of the third cam groove 24, thereby moving the sliding frame 33 in a direction away from the movable lens groups 11 and 12.

At the same time, the stop pin 37 comes into contact with the front left side face of the mirror frame 18a to depress the latter which has been balanced by the force of the coil spring 35, so that the reflecting mirror 18, secured to the mirror frame 18a, is slightly rotated about the common axis of the pins 31V and 32V in the direction D. The angular displacement of the reflecting mirror 18 is selected, so that the deviation of the optical axis of the movable lens groups 11 and 12, of the finder optical system 10A, from the optical axis of the stationary lens groups 14 and 15 thereof, is corrected. The optical axis deviation is caused by the movement of the reflecting mirror 18 together with the sliding frame 33.

Thus, the movement of the sliding frame 33 causes the optical path length of the finder optical system 10A to be extended thereby correcting the diopter of the finder optical system 10A upon macro-photographing. Note that the cam grooves 22 and 23 have parallel macro-transfer sections 22a and 23a which are parallel with the direction of movement of the cam plate 21, so that movement of the movable lens groups (variable power lens groups) 11 and 12 does not occur during the transfer to the macro-photographing position.

When the reflecting mirror 18 moves together with the sliding frame 33, the optical axis of the movable lens groups 11 and 12 of the finder optical system is deviated (offset) from the optical axis of the stationary lens groups 14 and 15 thereof. To eliminate the offset, the reflecting mirror 18 is rotated by the rotation of the mirror frame 18a thereby changing the optical axis Z, as can be seen in the illustrated embodiment.

Note that the present invention can be applied to a multifocus camera in which a focal length can be discontinuously varied.

According to the second embodiment of the present invention, when the finder optical system is in the macro-photographing position, the reflecting mirror in the finder optical system is moved in association with the operation of the driving mechanism for driving the lens groups of the finder optical system. Thus, optical path length can be easily varied. Accordingly the diopter of the finder optical system can be easily and smoothly corrected.

Although the first and second embodiments, illustrated in FIGS. 1 and 2, and FIGS. 3 through 5, are realized as a parallax correcting apparatus and a diopter correcting apparatus, respectively, the present invention can be applied to a combination thereof to realize a parallax and diopter correcting apparatus.

Furthermore, although the above mentioned embodiments of the present invention are applied to a zoom lens camera in which the lens of the finder optical system is moved from one (telephoto extremity) of the focal length extremities to the macro-position, it is also possible to apply the present invention to a camera which has no specific macro-position. Namely, the present invention can be applied to a camera which can take a picture of the object located at any short distance from the camera which causes parallax. In this alternative, the reflecting mirror driving mechanism and (or) rotating mechanism is arranged so that the reflecting mirror 18 is actuated independently of the lenses 11 and 12, and in accordance with the object distance.

I claim:

1. A parallax and/or diopter correcting apparatus in a camera having a photographing optical system separate from a finder optical system, comprising:
   a motor for driving said photographing optical system;
   a finder optical system driving mechanism for moving a lens assembly of the finder optical system, said finder optical system driving mechanism including a cam mechanism for moving said lens assembly, said cam mechanism comprising a cam plate driven for movement from said motor;
   a reflecting mirror provided in the finder optical system to change a direction of an optical axis thereof; and
   a reflecting mirror driving mechanism, including said cam mechanism, for at least rotating said reflecting mirror in a first rotational direction, to move the optical axis of the finder optical system towards an optical axis of the photographing optical system, or for rotating said reflecting mirror in a second rotational direction perpendicular to the first rotational direction.

2. A parallax and/or diopter correcting apparatus according to claim 1, wherein the photographing optical system and the finder optical system are comprised of a zoom photographing optical system and a zoom finder optical system, respectively.

3. A parallax and/or diopter correcting apparatus according to claim 2, including a macro-photographing function of predetermined macro-photographing range.

4. A parallax and/or diopter correcting apparatus according to claim 3, wherein said reflecting mirror driving mechanism maintains the optical axes of the photographing optical system and finder optical system substantially parallel to each other in a normal zoom range, and when the photographing optical system and the finder optical system are transferred to the macro-photographing range, the axis of the finder optical system is adjusted to be closer to the optical axis of the zoom photographing optical system.

5. A parallax and/or diopter correcting apparatus according to claim 3, wherein the photographing optical system is located above the finder optical system when the camera is in a horizontal position.

6. A parallax and/or diopter correcting apparatus according to claim 5, wherein the finder optical system is located above the photographing optical system and said reflecting mirror is located behind variable power lens groups, and wherein the finder optical system comprises a variable power lens group movable in an optical axis direction thereof, and an ocular optical system through which a bundle of rays reflected by said reflecting mirror is observed.

7. A parallax and/or diopter correcting apparatus according to claim 6, wherein said reflecting mirror driving mechanism has a substantially horizontal rotation axis about which said reflecting mirror is rotated by said reflecting mirror driving mechanism.

8. A parallax and/or diopter correcting apparatus according to claim 6, wherein said reflecting mirror driving mechanism has a substantially vertical rotation axis about which said reflecting mirror is rotated by said reflecting mirror driving mechanism.

9. A parallax and/or diopter correcting apparatus according to claim 8, further comprising an optical path length varying means for moving said reflecting mirror in the optical axis direction thereof to vary an optical path length of the finder optical system.

10. A parallax and/or diopter correcting apparatus according to claim 9, wherein said optical path length varying means moves said reflecting mirror to increase the optical path length in association with a transfer to the macro-photographing range.

11. A parallax and/or diopter correcting apparatus according to claim 10, wherein said reflecting mirror driving mechanism rotates said reflecting mirror to make light reflected by said reflecting mirror incident upon the ocular optical system in accordance with an increased optical path length.

12. A parallax and/or diopter correcting apparatus according to claim 2, further comprising an optical path length varying means for moving said reflecting mirror in the optical axis direction thereof to vary an optical path length of the finder optical system.

13. A parallax and/or diopter correcting apparatus according to claim 12, wherein said optical path length varying means includes said cam mechanism.

14. A parallax and/or diopter correcting apparatus according to claim 1, wherein the optical axis of the finder optical system is located in front of said reflecting mirror.

15. The parallax and/or diopter correcting apparatus according to claim 1, said reflecting mirror being rotated by said cam plate when said finder optical system driving mechanism drives said lens assembly within a predetermined region of a range of motion of said lens assembly.

16. The parallax and/or diopter correcting apparatus according to claim 15, said reflecting mirror not being rotated by said cam plate when said finder optical system driving mechanism drives said lens assembly within a region other than said predetermined region of the range of motion of said lens assembly.

17. The parallax and/or diopter correcting apparatus according to claim 15, said predetermined region comprising a macro photographing region.

18. The parallax and/or diopter correcting apparatus according to claim 1, said driving mechanism providing for rotation of said reflecting mirror in one of said first and second rotational directions for correcting parallax and providing for rotation of said reflecting mirror in the other of said first and second rotational directions for correcting diopter.

19. A parallax correcting apparatus in a camera having a macro-photographing range, and including a photographing optical system separate from a finder optical system, and a motor for driving said photographing optical system, said parallax correcting apparatus comprising:
   a finder optical system driving mechanism for moving a lens assembly of the finder optical system so to vary a focal length of the finder optical system in association with a change in a focal length of the photographing optical system, said finder optical system driving mechanism including a cam mechanism having a cam plate driven from said motor for moving said lens assembly into said macro-photographing range;

a reflecting mirror for varying a direction of an optical axis of the finder optical system; and a reflecting mirror driving mechanism, including said cam mechanism, for varying a direction of said reflecting mirror, thus enabling a field of view of the finder optical system to be coincidental with a photographable range thereof, in association with an operation of said finder optical system driving mechanism, which is actuated to transfer the finder optical system to the macro-photographing range.

20. The parallax correcting apparatus according to claim 19, said reflecting mirror being rotated by said cam plate when said finder optical system driving mechanism drives said lens assembly within a predetermined region of a range of motion of said lens assembly.

21. The parallax correcting apparatus according to claim 20, said reflecting mirror not being rotated by said cam plate when said finder optical system driving mechanism drives said lens assembly within a region other than said predetermined region of the range of motion of said lens assembly.

22. The parallax correcting apparatus according to claim 20, said predetermined region comprising a macro photographing region.

23. The parallax correcting mechanism according to claim 19, further comprising an optical path length varying means for moving said reflecting mirror in the optical axis direction to vary an optical path length of the finder optical system.

24. A diopter correcting apparatus in a camera having a macro-photographing range, and including a photographing optical system separate from a finder optical system, and a motor for driving said photographing optical system, said diopter correcting apparatus comprising:

a finder optical system driving mechanism for moving a lens assembly of the finder optical system so to vary a focal length of the finder optical system in association with a change in a focal length of the photographing optical system, said finder optical system driving mechanism including a cam mechanism having a cam plate driven from said motor, for moving said lens assembly into said macro-photographing range;

a reflecting mirror for varying a direction of an optical axis of the finder optical system;

a reflecting mirror driving mechanism, including said cam mechanism, for moving said reflecting mirror to vary an optical path length of the finder optical system; and a reflecting mirror rotating mechanism for varying the direction of an optical axis of the finder optical system, correcting a deviation of the optical axis of the finder optical system, caused by a change in optical path length, in association with an operation of said finder optical system driving mechanism which is actuated to transfer the finder optical system to the macro-photographing range.

25. A diopter correcting apparatus according to claim 24, wherein said reflecting mirror rotating mechanism is connected to said cam mechanism.

26. A diopter correcting apparatus according to claim 25, wherein said reflecting mirror rotating mechanism comprises a pin which contacts said reflecting mirror.

27. The diopter correcting apparatus according to claim 24, said reflecting mirror being rotated by said cam plate when said finder optical system driving mechanism drives said lens assembly within a predetermined region of a range of motion of said lens assembly.

28. The diopter correcting apparatus according to claim 27, said reflecting mirror not being rotated by said cam plate when said finder optical system driving mechanism drives said lens assembly within a region other than said predetermined region of the range of motion of said lens assembly.

29. The diopter correcting apparatus according to claim 27, said predetermined region comprising a macro photographing region.

* * * * *

UNITED STATES PATENT AND TRADEMARK OFFICE
CERTIFICATE OF CORRECTION

PATENT NO. :   5,345,287
DATED      :   September 6, 1994
INVENTOR(S) :  I. TAGUCHI It is certified that error appears in the above-indentified patent and that said Letters Patent is hereby corrected as shown below:

At column 7, line 51 (claim 4, line 8) of the printed patent, change "the axis" to ---the optical axis---.

Signed and Sealed this

Eighteenth Day of April, 1995

Attest:

BRUCE LEHMAN

Attesting Officer

Commissioner of Patents and Trademarks